(12) United States Patent  (10) Patent No.: US 7,561,593 B1
Wilkie  (45) Date of Patent: Jul. 14, 2009

(54) FRAME RELAY ACCELERATED LOCAL MANAGEMENT INTERFACE STATUS-INQUIRY MESSAGES

(75) Inventor: George Wilkie, Fife (GB)

(73) Assignee: Cisco Technology, Inc., San Jose, CA (US)

( * ) Notice: Subject to any disclaimer, the term of this patent is extended or adjusted under 35 U.S.C. 154(b) by 1687 days.

(21) Appl. No.: 09/947,736

(22) Filed: Sep. 6, 2001

(51) Int. Cl.
*H04L 12/26* (2006.01)

(52) U.S. Cl. .................. 370/450; 370/449; 370/346

(58) Field of Classification Search ......... 370/229–235, 370/241–251, 310, 310.2, 328, 346, 449–457, 370/216
See application file for complete search history.

(56) References Cited

U.S. PATENT DOCUMENTS

| | | | | |
|---|---|---|---|---|
| 4,742,357 A | * | 5/1988 | Rackley | 342/457 |
| 6,418,119 B1 | * | 7/2002 | Hatta et al. | 370/235 |
| 6,615,161 B1 | * | 9/2003 | Carney et al. | 702/186 |
| 6,654,957 B1 | * | 11/2003 | Moore et al. | 725/111 |
| 6,657,970 B1 | | 12/2003 | Buckingham et al. | 370/249 |
| 6,744,780 B1 | * | 6/2004 | Gu et al. | 370/450 |
| 2002/0163891 A1 | | 11/2002 | Natarajan et al. | 370/254 |

\* cited by examiner

*Primary Examiner*—Phuc H Tran
(74) *Attorney, Agent, or Firm*—Campbell Stephenson, LLP (57) ABSTRACT

A link restoration mechanism includes sending status-inquiry messages at a varying rate between two devices. Under normal operating conditions, keep-alive messages are sent from one device to another to determine the status of the communication link. The keep-alive messages are sent periodically to achieve an on-going status of the communication link between the two devices. If a pre-determined percentage of keep-alive messages fail to be received or are invalid, the communication link is declared down, that is, not functioning correctly, and data exchanges between the two devices cease. Whenever the communication link is suspected to be down due to a disruption in the sending of keep-alive messages, keep-alive messages are sent at an accelerated rate. Thus, after a pre-determined number of valid responses are received the communication link can be declared functioning normally and data exchanges between the two devices can continue.

53 Claims, 5 Drawing Sheets

FRAME RELAY ACCELERATED LOCAL MANAGEMENT INTERFACE STATUS-INQUIRY MESSAGES

BACKGROUND OF THE INVENTION

1. Field of the Invention

The present invention relates to the field of network communications and more particularly of communication link integrity.

2. Description of the Related Art

A network is the interconnection of two or more communicating network elements (i.e., data sources and/or sinks) over one or more data links. Normal communication can be disrupted when a communication link is down, network element software is not functioning correctly, a network element in the network is down, or some other such failure occurs. A network element must detect disruptions of normal communication as soon as possible to minimize discontinuity of network communication and service.

One common method of detecting a disruption of normal communication between network elements utilizes keep-alive messages. One network element, referred to as a sending network element, periodically transmits keep-alive messages, for example, once every 10 seconds, and the other network element, referred to as a listening network element, monitors for and responds to the keep-alive messages. The keep-alive messages contain sequence numbers from both network elements. If the listening network element repeatedly fails to receive valid keep-alive messages within a reasonable time frame or receives keep-alive messages containing invalid sequence numbers, the listening network element concludes that normal communication is disrupted and declares the link down. The listening network element typically waits 15 seconds before declaring a keep-alive message not received and monitors for typically three out of four invalid messages before declaring the link down. A disruption in keep-alive messages can be due to a failover from one route processor to another (i.e., switching from a first route processor to a second due to a failure in the first route processor), or after an interface was administratively shutdown and re-enabled or some other such failure occurs. The listening network element continues to monitor for periodic keep-alive messages to detect restoration of the communication link. After the listening network element receives several consecutive valid keep-alive messages, for example, four, the listening network element concludes that normal communication has been restored and declares the communication link up.

In a high availability environment, the time the communication link is down is very significant and should be minimized. In the above example, waiting 40 seconds, that is waiting for four consecutive valid responses, each 10 seconds apart, to restore the communication link can have serious impacts on service.

SUMMARY OF THE INVENTION

In accordance with the present invention, a link restoration mechanism includes sending keep-alive messages at a varying rate between two devices.

Under normal operating conditions, keep-alive messages, also referred to as status-inquiry messages, are sent from one device, referred to as a sending device, to another device, referred to as a listening device, to determine the status of the communication link. The keep-alive messages are sent periodically, for example every 10 seconds, to achieve an on-going status of the communication link between the two devices. If a pre-determined percentage of keep-alive messages, for example, three out of four previous keep-alive messages or 75%, fail to be received by the listening device or contain sequence number errors, the listening device declares the communication link down, i.e., not functioning correctly, and data exchanges between the two devices cease.

When a sending device recovers from a period where there may have been a disruption in the sending of keep-alive messages, the sending device cannot be certain that the communication link is still up and functioning normally. Therefore, the sending device sends keep-alive messages at an accelerated rate, for example, every one or two seconds or immediately following the keep-alive response. After the sending device sends a pre-determined number of keep-alive messages at the accelerated rate, for example, four consecutive accelerated keep-alive messages, the sending device can assume that the communication link is functioning normally and the sending device can return to sending keep-alive messages at a normal periodic rate, for example, every ten seconds. Data exchanges between the two devices can continue.

In one embodiment of the present invention, the keep-alive messages are Local Management Interface (LMI) frame relay status-inquiry messages.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention that is defined in the claims following the description.

Introduction

An efficient link restoration mechanism is introduced. Under normal operating conditions, keep-alive messages, also referred to as status-inquiry messages, are sent from one device, referred to as a sending device, to another device, referred to as a listening device, to determine the status of the communication link between the two devices. The keep-alive messages are sent periodically, for example, every 10 seconds, to achieve an on-going status of the communication link. If a pre-determined percentage of the keep-alive messages, for example, three out of four previous keep-alive messages or 75%, fail to be received by the listening device or contain sequence number errors, the listening device declares the communication link down and data exchanges between the two devices cease.

When the sending device recovers from a period where there may have been a disruption in the sending of keep-alive messages, the sending device cannot be certain that the communication link is still up and functioning normally. Therefore, the sending device sends keep-alive messages at an accelerated rate, for example, every one or two seconds or immediately following the keep-alive response. After the sending device sends a pre-determined number of keep-alive messages at the accelerated rate, for example, four consecutive accelerated keep-alive messages, the sending device can assume that the communication link is functioning normally and the sending device can return to sending keep-alive messages at a normal periodic rate, for example, every 10 seconds. Data exchanges between the two devices can continue.

Thus, the communication link can be restored quickly and efficiently, reducing the overall amount of time that the link is down and data is not exchanged. In addition, no changes are necessary in the listening device to implement this invention because the listening device is not aware of the accelerated rate and responds as usual to received keep-alive messages.

Example Networking Environment

Figure 1:
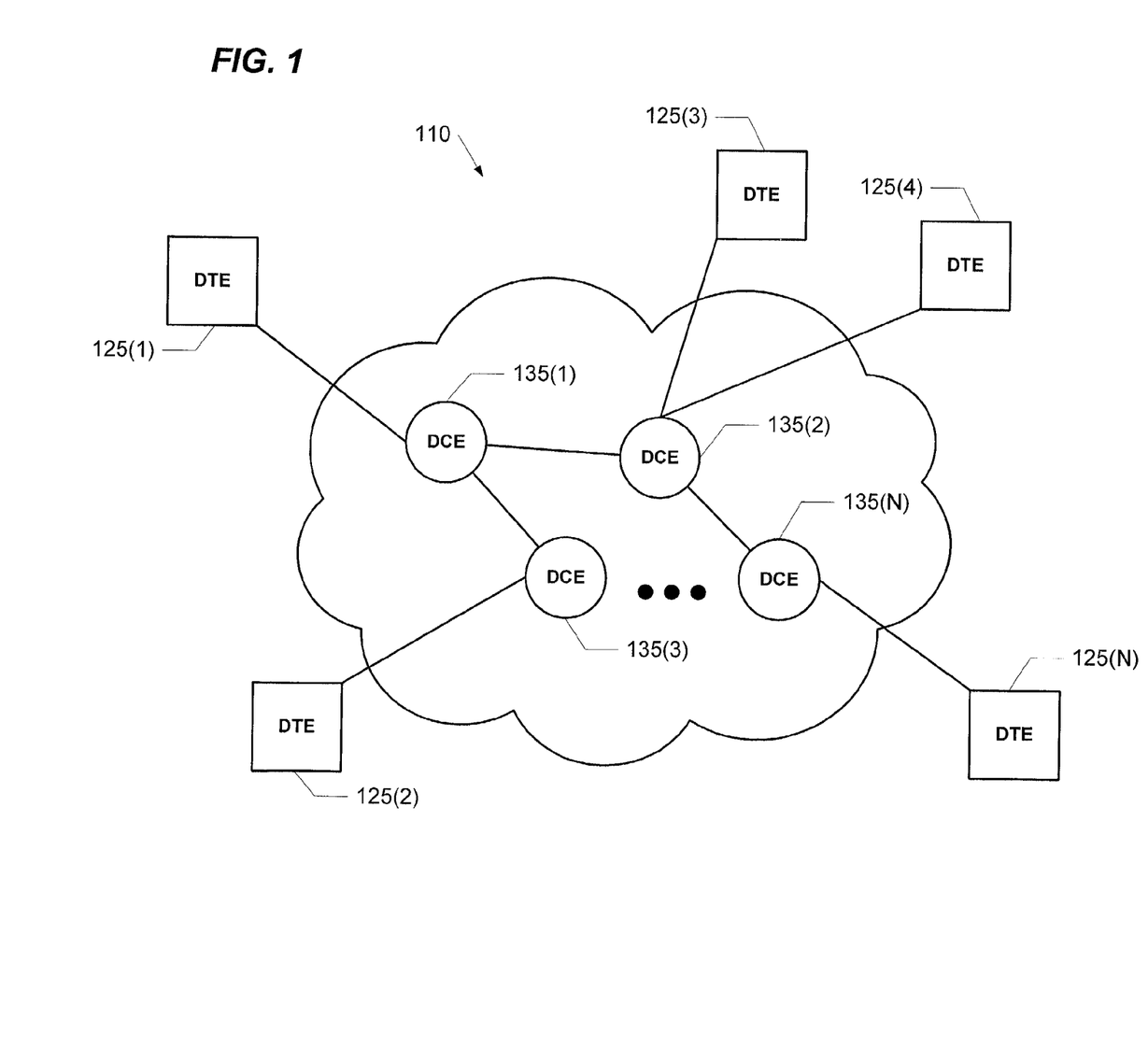
FIG. 1 illustrates a network environment in which embodiments of the present invention may be practiced.

FIG. 1 illustrates a network environment 110 in which embodiments of the present invention may be practiced. Network 110 can be, for example, a Frame Relay packet switched network (PSN). Frame Relay is a high-performance protocol that operates at the physical and data link layers of the Open Systems Interconnect (OSI) reference model. Frame Relay utilizes packet-switched technology to enable network elements to dynamically share the available bandwidth of network 110. Variable-length packets are used for efficient and flexible transfers.

Network 110 includes data terminal equipment devices (DTEs) 125(1)-(N), referred collectively as DTEs 125, and data circuit-terminating equipment devices (DCEs) 135(1)-(N), referred collectively as DCEs 135. DTEs 125 are typically located on the premises of a customer and can be owned by the customer. Examples of DTEs 125 include terminals, personal computers, routers, and bridges. DCEs 135 are typically carrier-owned internetworking devices that provide clocking and switching services in network 110. In most cases, DCEs 135 are packet switches.

It will be noted that the variable identifier "N" is used in several instances in FIG. 1 to more simply designate the final element (e.g., DTE 125(N), DCE 135(N), and so on) of a series of related or similar elements (e.g., DTEs 125(1)-(N), DCEs 135(1)-(N), and so on). The repeated use of such variable identifiers is not meant to imply a correlation between the sizes of such series of elements. The use of such variable identifiers does not require that each series of elements have the same number of elements as another series delimited by the same variable identifier. Rather, in each instance of use, the variable identified by "N" may hold the same or a different value than other instances of the same variable identifier. For example, DTE 125(N) may be the tenth DTE in a series of DTEs, whereas DCE 135(N) may be the forty-eighth DCE in a series of DCEs.

The connection between one of DTEs 125 and one of 135 DCEs, for example, between DTE 125(1) and DCE 135(1), consists of both a physical-layer component and a link-layer component. The physical component defines the mechanical, electrical, functional, and procedural specifications for the connection between the devices. One of the most commonly used physical-layer interface specifications is the recommended standard RS-232 specification. The link-layer component defines the protocol that establishes the connection between the devices.

Frame Relay and Local Management Interface (LMI)

A Frame Relay virtual circuit is a logical connection created between two of DTEs 125 across network 110. For example, a Frame Relay virtual circuit can include DTE 125(2) and DTE 125(3). The virtual circuit provides a bi-directional communications path from DTE 125(2) to DTE 125(3). A virtual circuit can pass through any number of intermediate DCEs 135 located within network 110. Frame Relay virtual circuits fall into two categories: switched virtual circuits (SVCs) and permanent virtual circuits (PVCs).

SVCs are temporary connections used in situations requiring only sporadic data transfer between DTEs 125 across the network 110. If an SVC remains in an idle state for a defined period of time, the virtual circuit can be terminated. At least two of DTEs 125 must establish a new SVC if there is additional data to be exchanged.

PVCs are permanently established connections that are used for frequent and consistent data transfers between DTEs 125 across network 110. Unlike SVCs, PVCs are not terminated as a result of being in an idle state. DTEs 125 can begin transferring data whenever they are ready because the circuit is permanently established.

The majority of Frame Relay networks deployed today are provisioned by service providers who intend to offer transmission services to customers. This is often referred to as a public Frame Relay service. Frame Relay is implemented in both public carrier-provided networks and in private enterprise networks.

Local Management Interface (LMI) is a Frame Relay control plane protocol that runs between a DTE device, for example, DTE 125(1) that can be a router, and a DCE device, for example DCE 135(1) that can be a switch. LMI is a set of enhancements to the basic Frame Relay specification. The main function of LMI is link integrity verification utilizing keep-alive messages and status reporting.

LMI link integrity verification exchanges sequence numbers between a DTE device and a DCE device. The DTE device sends its own sequence number and the DCE device sequence number from the last response received from the DCE device (or zero if this is the first exchange). The DCE device responds with its own sequence number and the DTE device sequence number from the last inquiry received from the DTE device. Both the DTE and the DCE devices verify that their own sequence number matches the one echoed back from the other. A mismatch of a sequence number is an invalid response. In addition, a failure to receive a message within the expected time, for example, 15 seconds, is an invalid response.

LMI virtual circuit status messages provide communication and synchronization between Frame Relay DTEs 125 and DCEs 135. These messages are used to periodically report on the status of PVCs, which prevents data from being sent over PVCs that no longer exist.

Figure 2:
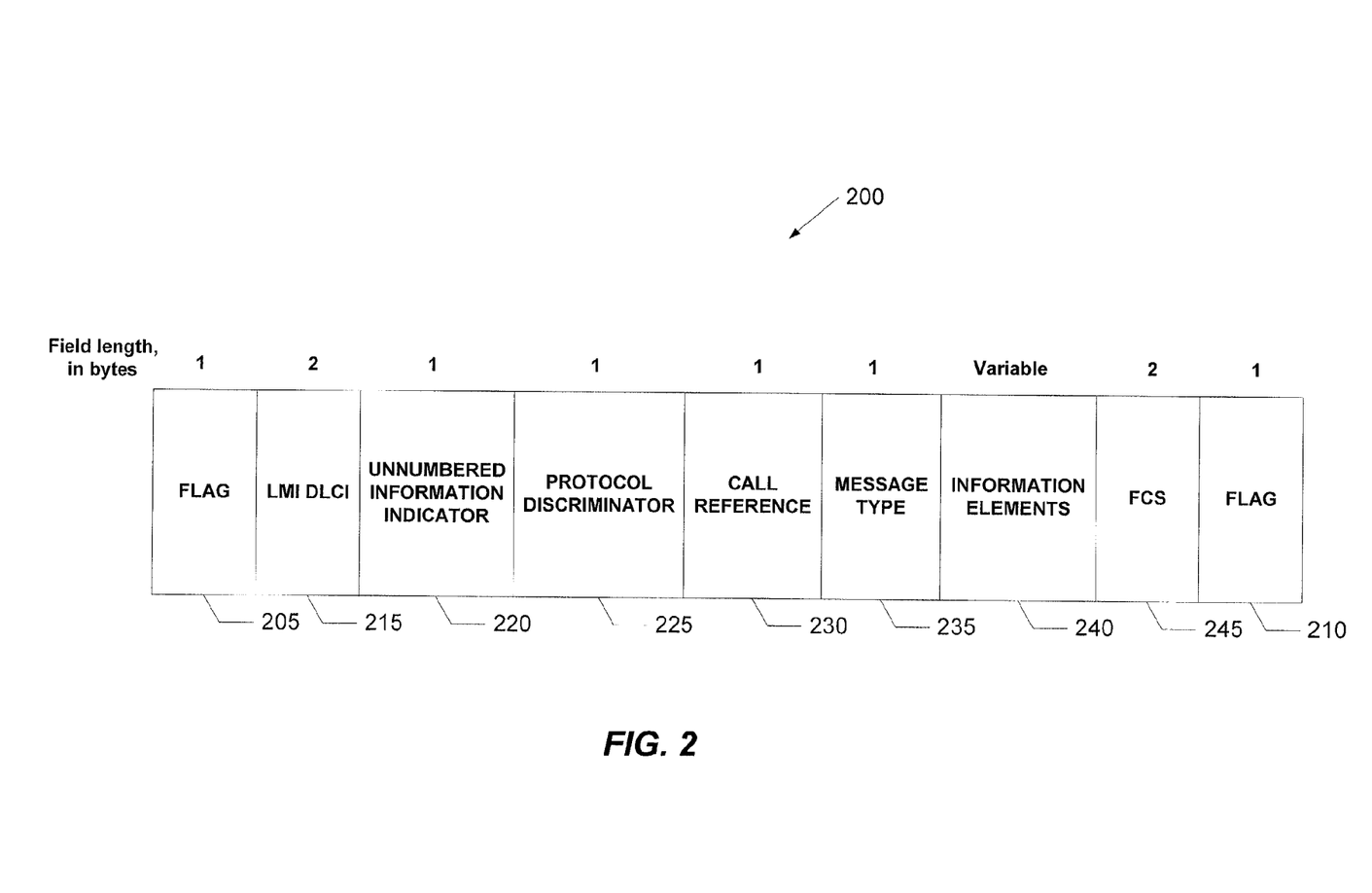
FIG. 2 illustrates the Frame Relay Local Management Interface (LMI) frame format.

FIG. 2 illustrates the Frame Relay Local Management Interface (LMI) frame format. An LMI frame 200 includes multiple fields that conform to the LMI specification. Flag fields 205 and 210 delimit the beginning and end of LMI frame 200. An LMI data-link connection identifier (DLCI) field 215 identifies the frame as an LMI frame instead of a basic Frame Relay frame. An unnumbered information indicator field 220 identifies the frame as unnumbered information. A protocol discriminator field 225 contains a value indicating that the frame is an LMI frame. A call reference field 230 is the dummy call reference and contains zeroes. A message type field 235 labels the frame as a status-inquiry or a status message type. A status-inquiry message allows a user device to inquire about the status of the network. A status message responds to status-inquiry messages. Status messages include keep-alive and PVC status messages. An information elements field 240 contains a variable number of individual information elements (IEs). One of the information elements, in particular, a link integrity verification IE, contains two sequence numbers passed between a sending device and a listening device. A send sequence number is an incrementing count that is echoed back by the receiving device in the next message. A receive sequence number is an echo back of the send sequence number received in the previous message. The sequence numbers are checked by the receiving device to determine if a valid keep-alive message or response has been received. A frame check sequence (FCS) field 245 ensures the integrity of transmitted data by detecting errors in the frame introduced at the physical layer.

Utilizing LMI frame format 200, status-inquiry messages, in particular, keep-alive messages, and status message responses are used to verify the integrity of a communications link between one of DTEs 125 and one of DCEs 135. A router, for example, DTE 125(1) sends a keep-alive message periodically, for example, every 10 seconds, to a switch, for example DCE 135(1). If the switch receives and understands the keep-alive message, the switch responds with a status message response. If a specified number of keep-alive exchanges fail, for example, three missing or invalid keep-alive messages out of four, the switch declares the link down. The switch typically waits 15 seconds for a keep-alive message from the router before determining the message missing. The switch continues waiting for keep-alive messages to detect recovery of the communications link. After, for example, four valid keep-alive messages, the communications link can be declared up, that is, functioning normally.

Accelerated Keep-Alive Messaging

Keep-alive messages are typically sent at a periodic rate, for example, every ten seconds. According to the present invention, the frequency of keep-alive exchanges is increased after a link failure is suspected. By increasing the frequency of keep-alive exchanges after a suspected link failure, the communications link can be brought into service almost immediately. In traditional systems where keep-alive messages are sent, for example, every 10 seconds, the communications link cannot be brought into service until the specified number of valid keep-alive messages have been received, for example, at least 40 seconds if four consecutive valid keep-alive messages are needed.

According to the present invention, only the router is aware of the accelerated process. The switch merely responds to keep-alive messages as received. Instead of waiting a specified delay, for example, ten seconds between the sending of keep-alive messages, the router sends keep-alive messages at an accelerated rate, for example, every one or two seconds or immediately after the keep-alive response. The router returns to the normal periodic cycle for sending keep-alive messages, for example, every 10 seconds, after sending at least the pre-determined number of consecutive valid keep-alive messages at the accelerated rate.

The following is pseudo code illustrating keep-alive message processing for both a router and a switch according to an embodiment of the present invention. In this embodiment, upon device initialization, the communication link is presumed functioning correctly and therefore is declared up.

```
router: start_interface( )
    declare link up
    initialize number of accelerated polls
    send keepalive
    start periodic timer
router: timer_expiry( )
    if no valid response was received
        log error event
        if link up and error count above threshold
            declare link down
    send keepalive
    start periodic timer
router: valid_response_received( )
    log valid event
    if link down and valid events above threshold
        declare link up
    if number of accelerated polls > 0
        decrement number of accelerated polls
        restart periodic timer for fast or immediate expiry
switch: start_interface( )
    start periodic timer
    declare link up
switch: timer_expiry( )
    log error event
    if link up and error events above threshold
        declare link down
    start periodic timer
switch: keepalive_received( )
    if sequence number error
        log error event
        if link up and error events above threshold
            declare link down
    else
        log valid event
        if link down and valid events above threshold
            declare link up
    send keep-alive response
    start periodic timer
```

In one embodiment of the present invention, a dual route processor router utilizes accelerated cycles. The dual route processor router has a primary and a standby route processor. If the primary route processor fails, the standby route processor is enabled. This process is often referred to as a failover. When the primary route processor fails, LMI keep-alive messages can fail to be exchanged between the dual route processor router and, for example, a switch. If the time utilized for the standby route processor to become enabled exceeds 15 seconds, there is a risk that the switch will declare the link down due to two lost keep-alive messages and a sequence number error. By utilizing accelerated cycles, a communications link down condition can be avoided or at least minimized.

In another embodiment of the present invention, accelerated keep-alive messages are utilized after an administrative shutdown of an interface or communication link. Depending on the amount of time that the link was disabled, there is a risk that the link has been declared down. Once the interface is administratively re-enabled, a number of accelerated keep-alive messages can be sent to restore normal communications as quickly as possible.

Figure 3A:
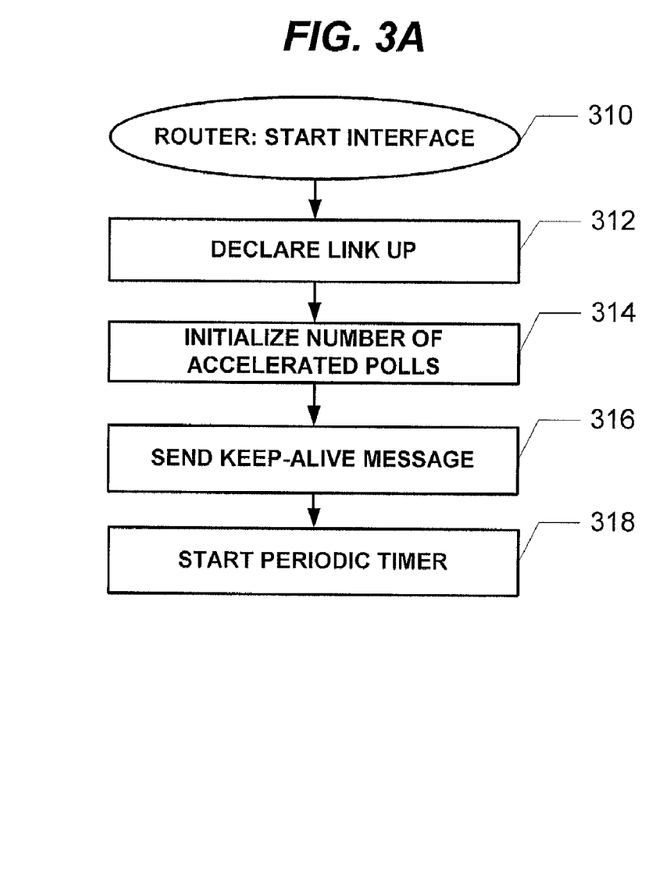
FIGS. 3A-3C illustrate flow diagrams of keep-alive message processing by a router or a sending device according to embodiments of the present invention.

FIG. 3A illustrates a keep-alive message processing routine by a router or a sending device according to an embodiment of the present invention. A router start interface routine begins, step 310. The router declares the communication link up, step 312. The number of accelerated polls is initialized, for example, to four, step 314. The router sends a keep-alive message, step 316. A periodic timer in the router is started, step 316. The periodic timer counts, for example, 10 seconds.

Figure 3B:
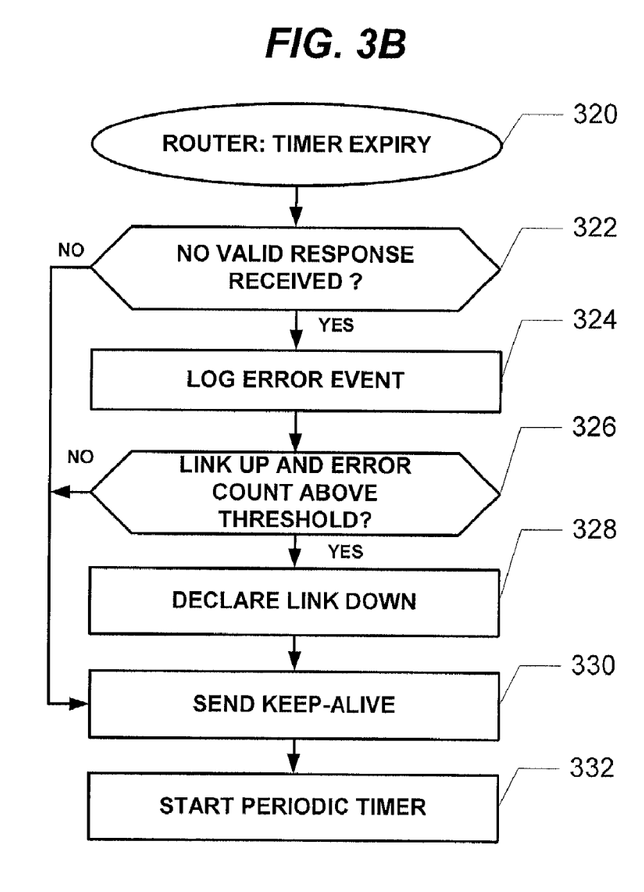

FIG. 3B illustrates another keep-alive message processing routine by a router or a sending device according to an embodiment of the present invention. A router timer expiry routine begins, step 320. The router monitors for the receipt of a valid response, step 322. If a valid response prior to the timer's expiration was not received, the router logs an error event, step 324. The router determines if the link is up and the error count is greater than an error threshold, step 326. If the link is up and the error count is greater than the error threshold, the router declares the link down, step 328. If a valid response was received, if either the link is not up or the error count is not above the threshold, or after the link is declared down (step 328), the router sends a keep-alive message, step 330. The router starts the periodic timer, step 332.

Figure 3C:
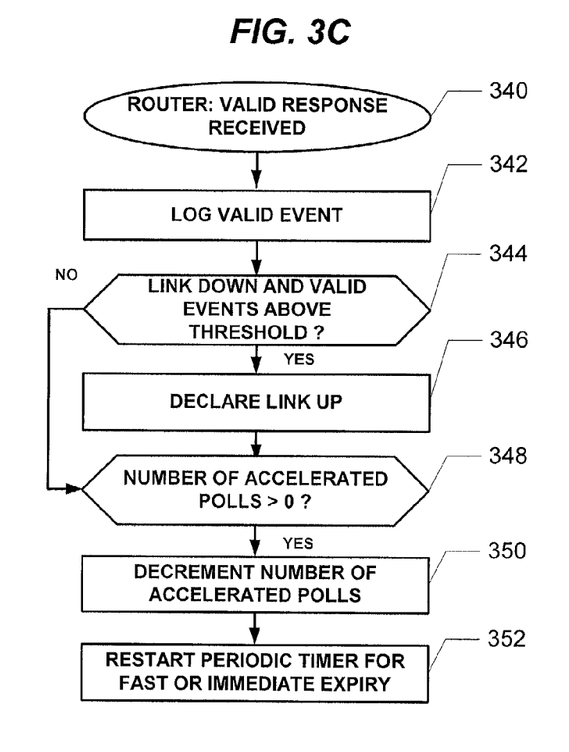

FIG. 3C illustrates another keep-alive message processing routine by a router or a sending device according to an embodiment of the present invention. A router valid response received routine begins, for example, upon the receipt of a valid response, step 340. The router logs a valid event, step 342. The router determines if the link is down and if the number of valid events is greater than a valid message threshold, step 344. If so, the router declares the link up, step 346. Next, the router determines if the number of accelerated polls is greater than zero, step 348. If so, the number of accelerated polls is decremented by one, step 350 and the periodic timer is restarted for fast or immediate expiry, step 352.

Figure 4A:
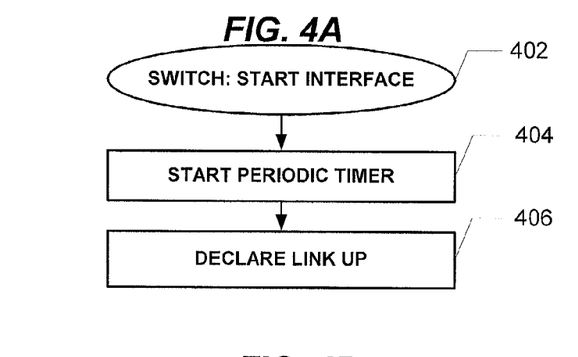
FIGS. 4A-4C illustrate flow diagrams of keep-alive message processing by a switch or a listening device according to embodiments of the present invention.

FIG. 4A illustrates keep-alive message processing routine by a switch or a listening device according to an embodiment of the present invention. A switch start interface routine begins, step 402. A periodic timer in the switch is started, step 404. The switch declares the communication link up, step 406.

Figure 4B:
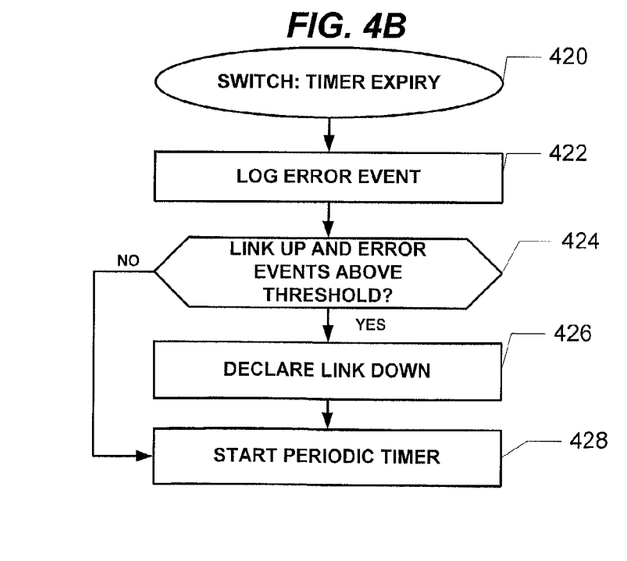

FIG. 4B illustrates another keep-alive message processing routine by a switch or a listening device according to an embodiment of the present invention. A switch timer expiry routine begins, for example upon the expiration of the periodic timer, step 420. The switch logs an error event, step 422. The switch determines if the link is up and if the error events are greater than an error threshold, step 424. If so, the switch declares the link down, step 426. The periodic timer is started, step 428.

Figure 4C:
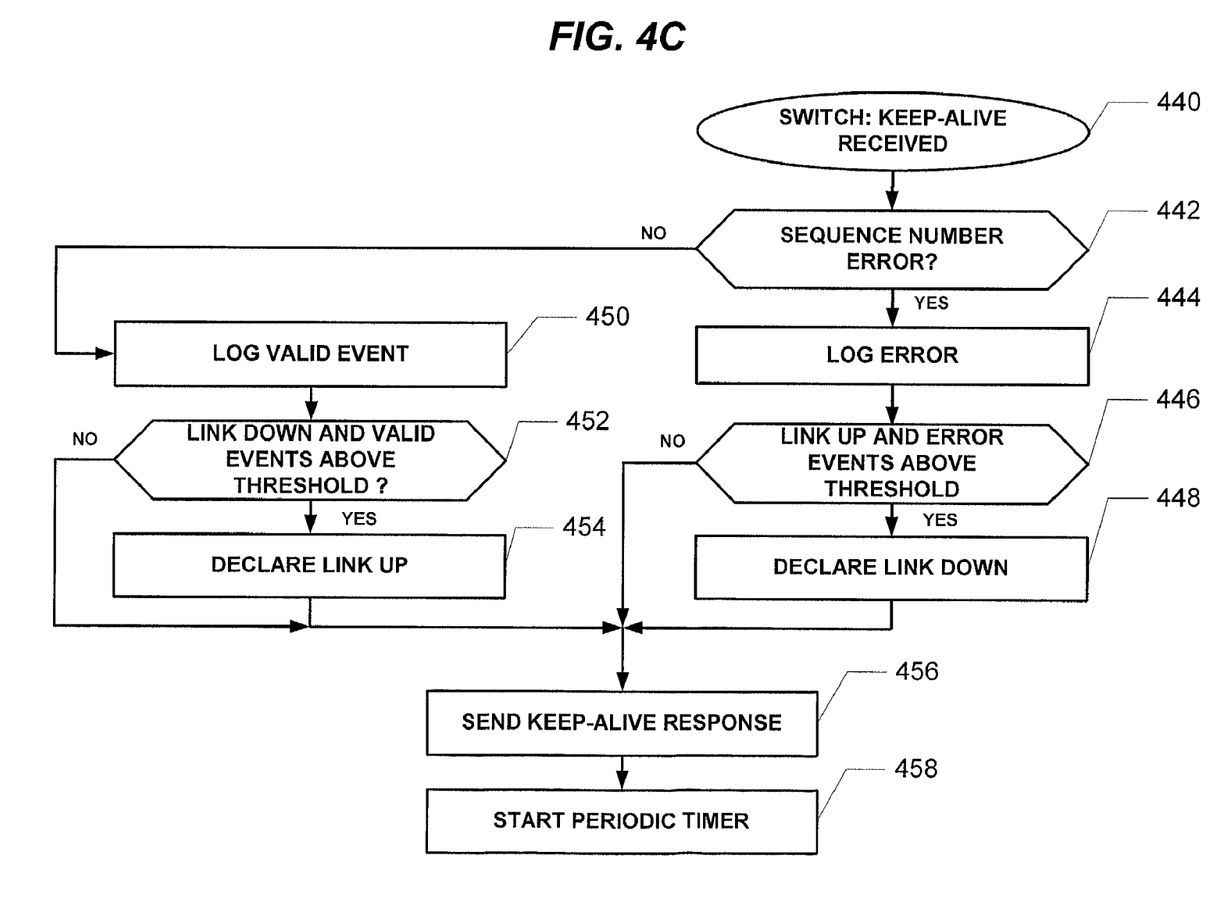

FIG. 4C illustrates another keep-alive message processing routine by a switch or a listening device according to an embodiment of the present invention. A switch keep-alive received routine begins, for example, upon the receipt of a keep-alive message, step 440. The switch determines if there is a sequence number error in the received keep-alive message, step 442. If so, the switch logs an error, step 444. The switch then determines if the link is up and the error events are greater than an error threshold, step 446. If so, the link is declared down, step 448.

If there is not a sequence number error in the received keep-alive message, the switch logs a valid event, step 450. The switch determines if the link is down and the valid events are greater than a valid event threshold, step 452. If so, the link is declared up, step 454.

If the determination in step 446 or step 452 is negative, after the link is declared down in step 448 or after the link is declared up in step 454, the switch sends a keep-alive response, step 456. The switch then starts the periodic timer, step 458.

FIGS. 3A-3C and 4A-4C illustrate flow diagrams of keep-alive message processing routines according to embodiments of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various exemplary modules may be application specific hardware modules. The software modules discussed herein may include script, batch or other executable files, or combinations and/or portions of such files. The software modules may include a computer program or subroutines thereof-encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into sub-modules to be executed as multiple computer processes. Moreover, alternative embodiments may combine multiple instances of a particular module or sub-module. Furthermore, those skilled in the art will recognize that the operations described in exemplary embodiment are for illustration only. Operations may be combined or the functionality of the operations may be distributed in additional operations in accordance with the invention.

In other embodiments of the present invention, upon router initialization, the router can presume the link not functioning correctly and declare the link down. Upon receiving a valid response to a keep-alive message, keep-alive messages can be sent at an accelerated rate until the communication link can be declared up.

Although the present invention has been described implemented in a Frame Relay LMI network, any network utilizing keep-alive messages can benefit from accelerated cycles as described above. The present invention should not be taken to be limited to only Frame Relay LMI networks.

The Frame Relay LMI specification defines default parameters and parameter ranges. For example, sending a keep-alive message every ten seconds, requiring three out of four missing or invalid keep-alive messages to declare a link down, and requiring four consecutive valid keep-alive messages to declare a link up are default parameters specified by LMI. These numbers are used for exemplary purposes; any parameters and parameter ranges can be specified.

An exemplary rate of sending accelerated keep-alive messages every one or two seconds or immediately following the keep-alive response is given in the above embodiments. However, the accelerated rate can be any rate that is faster than the normal rate. For example, upon the receipt of a valid response, another keep-alive message can be immediately sent. In addition, the accelerated rate can be user configurable.

Other embodiments are within the following claims. Also, while particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method for efficient link restoration comprising:
   if in a normal operating state, sending a plurality of keep-alive messages to a network element at a periodic rate;
   if in a recovery operating state, sending another plurality of keep-alive messages to the network element at an accelerated rate; wherein
   the accelerated rate is faster than the periodic rate; and
   entering the recovery operating state upon detection of a potential disruption in the sending of the plurality of keep-alive messages.

2. The method as recited in claim 1, wherein the potential disruption comprises a route processor failover.

3. The method as recited in claim 1, further comprising:
   entering the normal operating state if a specified consecutive number of the another plurality of keep-alive messages receive valid responses.

4. The method as recited in claim 3, wherein valid responses are responses received within a specified time frame that have valid sequence numbers.

5. The method as recited in claim 1, wherein the plurality of keep-alive messages are LMI frame relay status-inquiry messages.

6. The method as recited in claim 1, wherein sending the another plurality of keep-alive messages at the accelerated rate comprises:
   sending a keep-alive message; and
   if a valid response is received, immediately sending another keep-alive message.

7. The method as recited in claim 1, wherein the network element is unaware of a difference in the periodic rate and the accelerated rate.

8. The method of claim 1, wherein
   the potential disruption in the sending of the plurality of keep-alive messages comprises
   an administrative shutdown and restart of the network element.

9. The method as recited in claim 8, further comprising:
   if a threshold is exceeded, sending a third plurality of keep-alive messages at the periodic rate to the network element, wherein the threshold is exceeded when the second plurality of keep-alive messages receive valid responses within a specified time frame that have valid sequence numbers.

10. The method as recited in claim 8, wherein the administrative shutdown occurs during maintenance by a system operator.

11. The method as recited in claim 8, wherein the first and second pluralities of keep-alive messages are LMI frame relay status-inquiry messages.

12. The method as recited in claim 8, wherein the network element is unaware of a difference in the periodic rate and the accelerated rate.

13. An apparatus for efficient link restoration comprising:
    means for sending a plurality of keep-alive messages to a network element at a periodic rate if in a normal operating state;
    means for sending another plurality of keep-alive messages to the network element at an accelerated rate if in a recovery operating state; wherein
    the accelerated rate is faster than the periodic rate; and
    means for entering the recovery operating state upon detection of a potential disruption in the sending of the plurality of keep-alive messages.

14. The apparatus as recited in claim 13, wherein the potential disruption comprises a route processor failover.

15. The apparatus as recited in claim 13, further comprising:
    means for entering the normal operating state if a specified consecutive number of the another plurality of keep-alive messages receive valid responses.

16. The apparatus as recited in claim 15, wherein valid responses are responses received within a specified time frame that have valid sequence numbers.

17. The apparatus as recited in claim 13, wherein the plurality of keep-alive messages are LMI frame relay status-inquiry messages.

18. The apparatus as recited in claim 13, wherein the means for sending the another plurality of keep-alive messages at the accelerated rate comprises:
    means for sending a keep-alive message; and
    means for immediately sending another keep-alive message if a valid response is received.

19. The apparatus as recited in claim 13, wherein the network element is unaware of a difference in the periodic rate and the accelerated rate.

20. The apparatus of claim 13, wherein
    the potential disruption in the sending of the plurality of keep-alive messages comprises
    an administrative shutdown and restart of the network element.

21. The apparatus as recited in claim 20, further comprising:
    means for sending a third plurality of keep-alive messages at the periodic rate to the network element if a threshold is exceeded, wherein the threshold is exceeded when the second plurality of keep-alive messages receive valid responses within a specified time frame that have valid sequence numbers.

22. The apparatus as recited in claim 20, wherein the administrative shutdown occurs during maintenance by a system operator.

23. The apparatus as recited in claim 20, wherein the first and second pluralities of keep-alive messages are LMI frame relay status-inquiry messages.

24. The apparatus as recited in claim 20, wherein the network element is unaware of a difference in the periodic rate and the accelerated rate.

25. An apparatus for efficient link restoration comprising:
    a computer readable storage medium; and
    computer-executable instructions stored on the computer readable storage medium, wherein the computer-executable instructions are executable to:
    if in a normal operating state, send a plurality of keep-alive messages to a network element at a periodic rate;
    if in a recovery operating state, wherein the recovery operating state is entered upon detection of a potential disruption in the sending of the plurality of keep-alive messages, send another plurality of keep-alive messages to the network element at an accelerated rate; wherein
    the accelerated rate is faster than the periodic rate.

26. The apparatus as recited in claim 25, wherein the potential disruption comprises a route processor failover.

27. The apparatus as recited in claim 25, the computer-executable instructions are further executable to:
    enter the normal operating state if a specified consecutive number of the another plurality of keep-alive messages receive valid responses.

28. The apparatus as recited in claim 27, wherein valid responses are responses received within a specified time frame that have valid sequence numbers.

29. The apparatus as recited in claim 25, wherein the plurality of keep-alive messages are LMI frame relay status-inquiry messages.

30. The apparatus as recited in claim 25, wherein the computer-executable instructions are executable to send the another plurality of keep-alive messages at the accelerated rate by:
   sending a keep-alive message; and
   if a valid response is received, immediately sending another keep-alive message.

31. The apparatus as recited in claim 25, wherein the network element is unaware of a difference in the periodic rate and the accelerated rate.

32. The apparatus of claim 25 wherein
   the potential disruption in the sending of the plurality of keep-alive messages comprises
      an administrative shutdown and restart of the network element.

33. The apparatus as recited in claim 32, the computer-executable instructions further executable to:
   if a threshold is exceeded, send a third plurality of keep-alive messages at the periodic rate to the network element, wherein the threshold is exceeded when the second plurality of keep-alive messages receive valid responses within a specified time frame that have valid sequence numbers.

34. The apparatus as recited in claim 32, wherein the administrative shutdown occurs during maintenance by a system operator.

35. The apparatus as recited in claim 32, wherein the first and second pluralities of keep-alive messages are LMI frame relay status-inquiry messages.

36. The apparatus as recited in claim 32, wherein the network element is unaware of a difference in the periodic rate and the accelerated rate.

37. A communication system for efficient link restoration comprising:
   a router; and
   a switch coupled to the router via a communication link; wherein the router is configured to:
   if in a normal operating state, send a plurality of keep-alive messages to the switch at a periodic rate;
   if in a recovery operating state, send another plurality of keep-alive messages to the switch at an accelerated rate; wherein
      the accelerated rate is faster than the periodic rate; and
   enter the recovery operating state upon detection of a potential disruption in the sending of the plurality of keep-alive messages.

38. The communication system as recited in claim 37, wherein the potential disruption comprises a route processor failover.

39. The communication system as recited in claim 37, the router further configured to:
   enter the normal operating state if a specified consecutive number of the another plurality of keep-alive messages receive valid responses from the switch.

40. The communication system as recited in claim 39, wherein valid responses are responses received within a specified time frame that have valid sequence numbers.

41. The communication system as recited in claim 37, wherein the plurality of keep-alive messages are LMI frame relay status-inquiry messages.

42. The communication system as recited in claim 37, wherein to send the another plurality of keep-alive messages at the accelerated rate the router is configured to:
   send a keep-alive message; and
   if a valid response is received, immediately send another keep-alive message.

43. The communication system as recited in claim 37, wherein the switch is unaware of a difference in the periodic rate and the accelerated rate.

44. The communication system as recited in claim 37 wherein the potential disruption in the sending of the plurality of keep-alive messages comprises an administrative shutdown and restart of the network element.

45. The communication system as recited in claim 44, the router further configured to:
   if a threshold is exceeded, send a third plurality of keep-alive messages at the periodic rate to the switch, wherein the threshold is exceeded when the second plurality of keep-alive messages receive valid responses within a specified time frame that have valid sequence numbers.

46. The communication system as recited in claim 44, wherein the administrative shutdown occurs during maintenance by a system operator.

47. The communication system as recited in claim 44, wherein the first and second pluralities of keep-alive messages are LMI frame relay status-inquiry messages.

48. The communication system as recited in claim 44, wherein the switch is unaware of a difference in the periodic rate and the accelerated rate.

49. A method for efficient link restoration comprising:
   if in a normal operating state, sending a plurality of keep-alive messages to a network element at a periodic rate;
   if in a recovery operating state, sending another plurality of keep-alive messages to the network element at an accelerated rate; wherein
      the accelerated rate is faster than the periodic rate; and
   entering the recovery operating state upon detection of a disruption in the sending of the plurality of keep-alive messages, wherein the disruption is due to a route processor failover.

50. The method as recited in claim 49, further comprising:
   entering the normal operating state if a specified consecutive number of the another plurality of keep-alive messages receive valid responses.

51. The method as recited in claim 50, wherein valid responses are responses received within a specified time frame that have valid sequence numbers.

52. The method as recited in claim 49, wherein the plurality of keep-alive messages are LMI frame relay status-inquiry messages.

53. The method as recited in claim 49, wherein sending the another plurality of keep-alive messages at the accelerated rate comprises:
   sending a keep-alive message; and
   if a valid response is received, immediately sending another keep-alive message.

* * * * *